United States Patent [19]

LaRussa et al.

[11] Patent Number: 4,671,771
[45] Date of Patent: Jun. 9, 1987

[54] TARGET DESIGNATING RECOGNITION AND ACQUISITION TRAINER

[75] Inventors: Joseph LaRussa, Yorktown Heights, N.Y.; David S. Feron, Sherman, Conn.

[73] Assignee: Farrand Optical Co., Inc., Valhalla, N.Y.

[21] Appl. No.: 784,223

[22] Filed: Oct. 4, 1985

[51] Int. Cl.[4] .............................................. G09B 9/00
[52] U.S. Cl. ..................................................... 434/22
[58] Field of Search .............................. 434/16, 19–22

[56] References Cited

U.S. PATENT DOCUMENTS

| | | | |
|---|---|---|---|
| 3,691,284 | 9/1972 | Borjeson | 434/20 |
| 3,777,305 | 12/1973 | Stoutmeyer | 340/16 R |
| 4,246,605 | 1/1981 | LaRussa | 434/20 |

*Primary Examiner*—Leo P. Picard
*Attorney, Agent, or Firm*—Handal & Morofsky

[57] ABSTRACT

A target designation system for use in training an observer to acquire and recognize targets is disclosed. A scenario with targets is displayed in front of the observer who aligns his line of sight so that a reticle is superimposed on the acquired target. The display system consists of film illuminated by a cathode ray tube. Film is used to provide color, resolution and realism not available from cathode ray tubes or any other display system. Light rays from the display are partially transmitted through a beam-splitter to the observer and partially reflected through an optical window onto a photodetector. In addition, the projected image of the reticle is reflected by the beam-splitter toward the observer. The photodetector and optical window are positioned so that light rays from the scanning spot of the CRT raster impinge on the photodetector only when the scanning spot occupies a point on the CRT screen corresponding to the location on the film at which the image of the reticle is superimposed. When the observer closes a switch, the photodetector outputs on electrical pulse to the deflection yoke circuitry in response to receipt of light rays from the scanning spot. The deflection yoke circuitry in turn outputs electrical signals corresponding to the position coordinates of the acquired target to a computer. The position coordinates and designation of every target are stored in the computer memory. Upon locating the position coordinates of the acquired target in the memory, the computer outputs the acquired target's designation to a display.

25 Claims, 2 Drawing Figures

TARGET DESIGNATING RECOGNITION AND ACQUISITION TRAINER

TECHNICAL FIELD

The invention relates to a system for training trainees such as gunners, tank commanders and aircraft pilots in the task of acquiring concealed or camouflaged targets and recognizing them as friend or foe. The system provides the capability for designating the target acquired and then computing the trainee's score.

BACKGROUND OF THE INVENTION

Target acquisition and recognition training systems are used to train the aiming and firing of weapons. A scenario with targets is displayed to a trainee, who then aims the simulated gun and fires at a target. Prior art systems have notable disadvantages in that because of the number of scenarios and the variety of targets that may be incorporated in each scenario, it becomes very difficult to score the trainee since his selection (i.e., the target selected from a plurality and at which the gun is aimed) cannot be easily registered. Additionally, scenarios presented through cathode ray tubes lack resolution and therefore the realism of the real world. The alternative is to limit the simulation to one target at a time, with the attendant loss of realism and simplification of the task.

A possible solution might utilize a keyboard, through which the trainee is able to register his selection of the acquired target (for example, by inputting the class and position coordinates of the acquired target). The trainee's score could then be computed based on the information input via the keyboard. However, such a system would be disadvantageous in that registration of data by means of the keyboard is time-consuming and distracts from the training exercise.

SUMMARY OF THE INVENTION

The present invention as claimed is intended to provide a remedy. It eliminates the above-noted disadvantages by providing a target acquisition and recognition training system with a capability for automatic target designation and scoring.

The system according to the present invention comprises display, optical, detector and computer subsystems. The display subsystem may consist, for example, of film illuminated by a cathode-ray tube. A scenario with targets is photographically recorded on the film. Film provides the color, resolution and realism required for the task of target acquisition and recognition. The optical subsystem includes a beamsplitter and a reticle for viewing the scenario. The beamsplitter is positioned between the trainee and the illuminated film to partially transmit light rays from the displayed scenario toward the trainee and to reflect the projected image of a reticle toward the trainee.

The trainee aligns his line of sight so that the image of the reticle is superimposed on the acquired target. Light rays from the illuminated film are also partially reflected by the beamsplitter through an optical window to the detector subsystem. A photodetector with timing information corresponding to raster deflection voltages which indicate the point on the cathode ray tube screen corresponding to the location at which the image of the reticle as viewed by the trainee is superimposed on the film.

When the trainee "fires", closing a switch, the photodetector outputs in response to light rays from the cathode ray tube an electrical pulse whose timing controls the time at which the computer reads the deflection yoke signals. Thus, the deflection yoke voltage corresponds to the position coordinates of the acquired target and supplies this information to the computer subsystem. The position coordinates, designation and weighting value of every target at each moment in time are stored in the computer memory. This enables the computer to determine whether a "hit" has occurred. Upon locating the position coordinates of the acquired target in memory, the computer also outputs the acquired target's designation to a display. The trainee's score is computed taking into account the weighting value of the acquired target, which value corresponds to the assigned relative importance of the target.

BRIEF DESCRIPTION OF THE DRAWINGS

The preferred embodiment of the present invention will be described in detail with reference to the following drawings, in which.

DESCRIPTION OF THE PREFERRED EMBODIMENT

Figure 1:
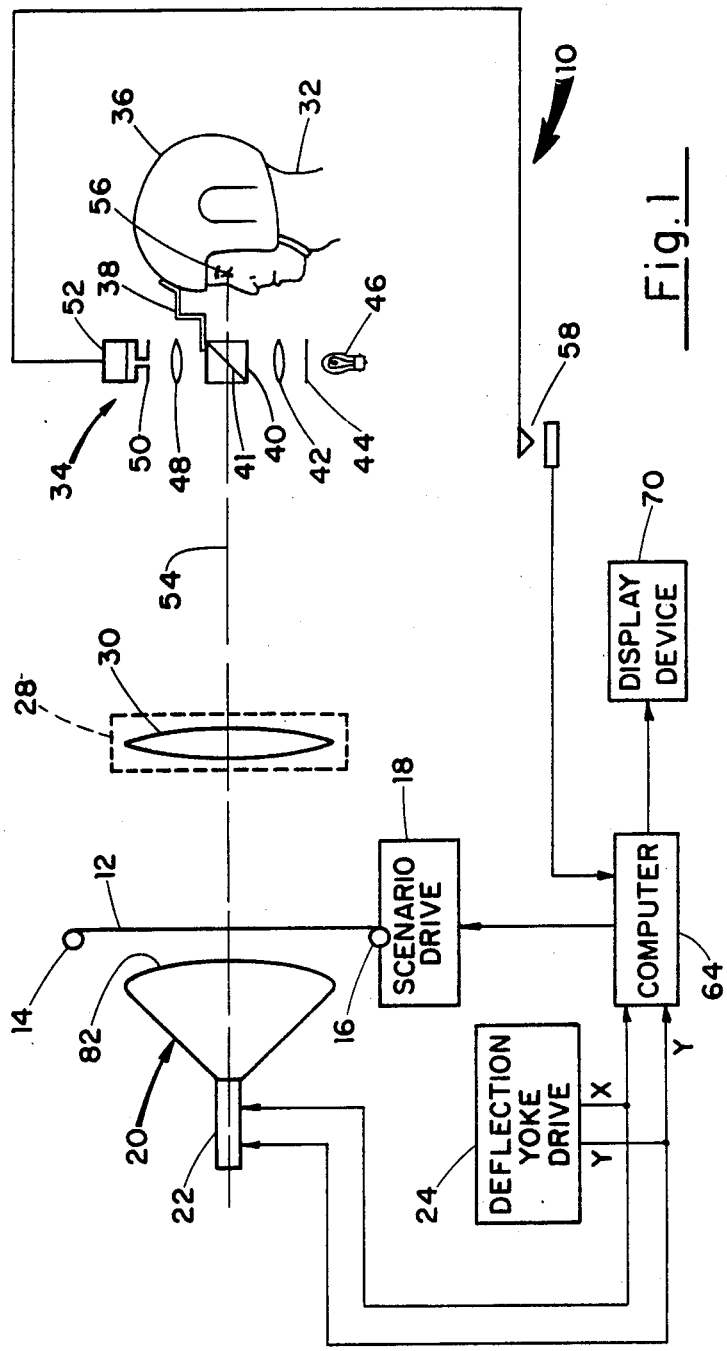
FIG. 1 is a system diagram of a target designation system according to the present invention.

The preferred embodiment of the targeting training system 10 according to the present invention is shown in FIG. 1. The visual input is in the form of a motion picture color transparency 12 rolled at its ends around rotatably mounted rollers 14 and 16, respectively. The rollers are geared to and driven by a scenario drive 18. Scenarios and targets are photographically recorded in sequence on color transparency 12. Each frame of the scenario comprises the same photograph of a real world scene that serves as a full color background of very high resolution into which different targets are dubbed with positions which vary from frame to frame in accordance with simulated target movement. The method for inserting a variety of targets against a photographic scenic background is a laboratory procedure that utilizes transparencies of background and moving targets, with multiple exposures and occulation of the background behind each target. The laboratory technique may also be used to occult portions of targets covered by the photographed background, when the "background" is, in fact, foreground (for example, when a target emerges from bushes, trees, rocks or man-made structures that form part of the "background" scene).

The roll of color transparency 12 is positioned forward of the face of the cathode ray tube 20. An infinity display system 28 utilizing a collimator lens 30 is positioned between the cathode ray tube 20 and a trainee 32 with its focal plane coincident with transparency 12. The infinity display system is employed to maintain apparent real world angular magnitudes and directions regardless of the motion of the trainee's head.

In designating a taret, the trainee 32 views the color transparency 12 through a beamsplitter array 34 which is fastened to a helmet 36 by a support member 38. The beamsplitter array 34 is positioned so that its beamsplitter cube 40, which incorporates a half-silvered planar reflector 41 is in a comfortable viewing position, i.e., directly in front of the eye of trainee 32. In an alternative construction, the beamsplitter array 34 may be fastened to a headband worn by the trainee.

As shown in FIG. 1, the beamsplitter array 34 comprises two separate optical trains. The first optical train comprises a projection lens 42, a reticle 44 and a lamp 46 which are aligned under beamsplitter cube 40. Reticle 44 comprises a pair of intersecting fine opaque lines placed on a transparent element and produces a reticle image seen by the trainee. The second optical train comprises a projection lens 48, a field limiting stop 50 and a detector 52, which are aligned above beamsplitter cube 40. The field stop 50 comprises a non-transmissive element with a hole in it which serves as a transmissive optical window that admits light onto detector 52. This window defines a circular area 53 (FIG. 2) of the raster on the face of cathode ray tube 20, the image of this area being the only part of the illuminating image seen by detector 52. Thus detector 52 has a substantially planar detector face with the image of the face of cathode ray tube 20 being focused by lens 48 on that face while the stop 50 allows only a part of that image to fall on the detector. The first and second optical trains are aligned so that the apparent position of the reticle on transparency 12 as reflected by beamsplitter 41 centers on the portion of luminous face 82 of the cathode ray tube which passes illumination through the hole in stop 50.

The electrical output of detector 52 is conected via a switch 58 to a computer 64. The x and y output ports of a deflection yoke drive 24 which drives cathode ray tube 20 are also coupled to computer 64. Computer 64 drives scenario drive 18 and a display device 70.

Figure 2:
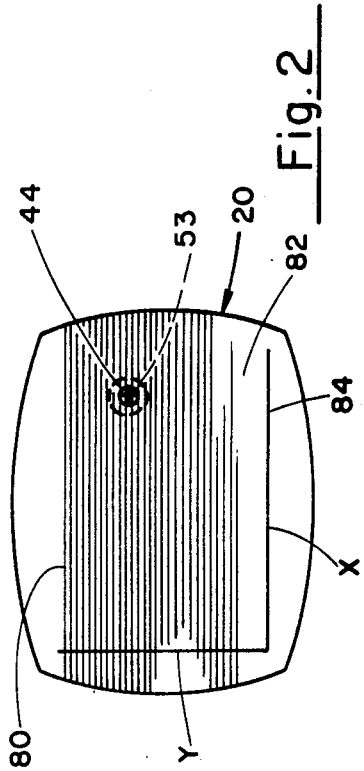
FIG. 2 is a front view of the CRT screen with the x-y coordinate system and the reticle superimposed.

FIG. 2 illustrates a front view of the illuminated cathode ray tube 20, showing some of the raster lines 80 on the cathode ray tube screen 82. The reticle 44 appears superimposed on the cathode ray tube screen 82 as seen by the trainee 32 during targeting. The position of reticle 44 in an imaginary x-y coordinate system 84 indicates the targeted area. It will be noted that this x-y coordinate system is depicted for illustrative purposes only and does not actually appear on the cathode ray tube screen 82.

The x-y positions of all of the targets are stored in the memory of computer 64 for each scenario. Storage in the computer of this information can most easily be achieved by having the computer simultaneously execute the tasks of controlling the positions on the film at which targets are superposed and recording those positions. Thus, each x-y location is correlated to the scene on color transparency 12 so that the recorded x-y position on cathode ray tube screen 82 corresponds dimensionally to the x-y position on the film. In addition, each target position stored in the memory of computer 64 will have a weighted value to define the relative importance of the target.

The raster beam of the cathode ray tube sweeps from left to right and from top to bottom in response to horizontal and vertical electrical signals which control the X and Y coordinates of the raster scanning beam. The location of the raster beam can be determined by the computer by processing the information contained in the x-y deflection signals for cathode ray tube 20.

Scenario drive 18 may be driven electronically in accordance with a timed sequence of commands output by the computer 64, thus causing rollers 14 and 16 to advance each frame of the film to be illuminated by the scanning of raster 80 in sequence.

Color transparency 12 is positioned a predetermined distance in front of cathode ray tube screen 82 so that the line structure of the raster is not visible through the transparent film. Alternatively, the visibility of the raster line structure may be reduced by defocusing the electron beam sweeping the raster, causing the raster lines 80 to appear to overlap.

Referring back to FIG. 1, it can be seen that when a photographed scenario has been positioned in front of the illuminating cathode ray tube 20, the trainee 32 views the scenario through beamsplitter cube 40 and collimator 28. In the meantime, lamp 46 emits light along the axis of alignment of lamp 46, reticle 44 and projection lens 42. This light is transmitted through reticle 44 and projection lens 42 in series. The image of the reticle is focused by lens 42 and reflected by beamsplitter cube 40 toward the trainee's eyes.

After passage through projection lens 42, the light beam is reflected toward the eye 56 of the trainee 32 by beamsplitter cube 40. Reticle 44 is apparently superimposed on the viewed scene of the film. Finally, light from the cathode ray tube coming from the position of a circular area 53 centered on the apparent position of the reticle is, due to proper alignment of stop 50, caused to excite detector 52.

When the trainee selects a target on the color transparency 12, he locates (i.e., aims) the reticle 44 by movement of his head, as in a modern helmet mounted reticle aiming system. FIG. 2 shows the superimposed reticle 44 in relation to the cathode ray tube screen 82. At the moment when the reticle is believed to be on the target (i.e., is believed to be accurately superimposed on the target), the trainee 32 closes switch 58 by depressing a trigger controlling the switch to close the circuit for a predetermined period of time. When the trigger is down, that portion or area 53 of the raster actually superimposed by the reticle is caused to fall on detector 52 because of the alignment of the first and second optical trains. If the switch is designed to be closed for a period of time equal to the field duration of the raster, the detector 52 will produce an output when the cathode ray tube beam is exciting portion 53 of the raster. Thus the computer can read the x and y deflection signals to store the location of all points on the raster corresponding to area 53. If these points are centered on a target, the computer can output a "hit" indication to display 70. However, if, while this is not the case, at least one point in area 53 corresponds to the location of a target, a "near miss" can be indicated by the display, which may also indicate the magnitude of the firing error. This near miss calculation is based on the assumption that the trainee is aiming at a target in area 53.

During operation, light emitted by the cathode ray tube and illuminated transparency 12 as a result of the electron beam impinging on cathode ray tube screen 82 is transmitted through collimator 28 and onto beamsplitter cube 40. At beamsplitter cube 40, the light is partially transmitted and partially reflected. The transmitted portion of the beam is projected toward the eye 56 of the trainee. The reflected portion of the beam is redirected along the axis of alignment of projector lens 48, field stop 50, and detector 52. The field of view presented to detector 52 is extremely small and is governed by the diameter of the hole in field stop 50 positioned in front of the detector.

The x-y coordinates and designation of every target for each scenario is stored in binary coded format in the memory of computer 64. In addition, a weighting value to define the relative importance (e.g., from the standpoint of military strategy) of each target is stored in memory in binary coded format for each pair of stored x and y coordinates. Also, other information for identifying each target may be stored in permanent memory. Depending on which target the reticle 44 is superimposed on at the moment when the trainee 32 closes switch 58, the computer 64 will read the data corresponding to the selected target in the permanent memory. This data will be decoded and then output to display device 70. The program may include a routine for computing the score of trainee 32, this score being based on the weighting value of the target selected. Of course, an ascending register may be provided in the working memory of the computer for storing the total score of trainee 32. Alternatively, information displayed will include only the identification of the target and its weighting value, which information will enable the instructor to compute the trainee's score.

The above description of the preferred embodiment is presented for illustrative purposes only and is not intended to limit the scope of the present invention as recited in the appended claims. It will be understood that modifications and variations may be effected without departing from the scope of the inventive concept herein disclosed. For example, the means for displaying the scenarios with targets is not limited to frames of color film illuminated by a cathode ray tube screen. The above-described system may be adapted for use with a television screen and a video disk recorder.

We claim:

1. A system for training an individual to aim, comprising:
   (a) simulator means for displaying a training scenario in light emitting raster form, said scenario including a background and a plurality of targets having different positions at different points in time;
   (b) viewing means for coupling said scenario to a trainee's eyes;
   (c) reticle means for presenting a reticle to said trainee apparently superimposed over a point on said scenario;
   (d) detector means optically aligned with said reticle means for detecting light from the portion of said raster over which said reticle means is centered to generate timing signals said reticle means and said detector means comprising, respectively, opposite surfaces of a beamsplitter and being fixed to a helmet worn by said trainee;
   (e) trigger means adapted to be manually actuated by said trainee for receiving a firing time from said trainee;
   (f) computer means, responsive to said timing signals, for determining the position of said reticle when said trigger means is actuated and for storing the target position of each of said targets at each point in time, and for determining when said target positions coincide or nearly coincide with the position of said reticle during said firing time; and
   (g) output means for producing an indication of coincidence.

2. A system as in claim 1, wherein said simulator means is a raster scanned cathode ray tube driven by a video output of said scenario.

3. A system as in claim 1, wherein said viewing means is a collimator.

4. A system as in claim 1, wherein said reticle means is a reticle transparency coupled to said beamsplitter by a first optical train.

5. A system as in claim 4, wherein said detector means comprises a second optical train coupled to said beamsplitter for forming an image of said light emitting raster and a mask for blocking all but that portion of the raster superimposed by said reticle and a photodetector for detecting light energy from the unblocked portion of the raster.

6. A system as in claim 5, wherein said simulator means comprises a cathode ray tube driven by horizontal and vertical deflection signals and a constant intensity, and which is positioned behind a transparency depicting said scenario.

7. A target designation system comprising:
   (a) first display means for displaying a scenario with targets thereon for viewing by an observer;
   (b) a first optical train secured to the helmet of said observer for projecting the image of a reticle means along the line of sight of said observer;
   (c) switching means for indicating that a simulated gun has been fired;
   (d) a second optical train secured to said helmet for outputting an electrical signal indicating the position of the image of said reticle means on said scenario during the closure of said switching means;
   (e) computer means having memory means for storing the position coordinates of each of said targets in the form of binary data;
   (f) means for outputting electrical signals, corresponding to the position coordinates of said target on which the image of said reticle means is superimposed, to said computer means in response to said second optical train; and
   (g) second display means operatively connected to display alphanumeric data in response to commands from said computer means, wherein said alphanumeric data corresponds to the target having stored position coordinates substantially equal to the position coordinates of the image of said reticle means on said scenario and the position of the image with respect to the reticle.

8. A target designation system as in claim 7, further comprising beamsplitting means positioned to transmit light rays emitted from said first display means toward the eye of said observer and to reflect the projected image of said reticle means toward the eye of said observer.

9. A target designation system as in claim 8, wherein said second optical train comprises detector means having a photosensitive surface and field stop means having an optical window, said field stop means being positioned so that light rays can impinge on the photosensitive surface of said detector means only after passing through the optical window of said field stop means.

10. A target designation system as in claim 9, wherein said detector means is positioned to receive light rays from said first display means after reflection by said beam-splitting means.

11. A target designation system as in claim 10, wherein said detector means, said beamsplitting means and said reticle means are positioned with said beamsplitting means between said first display means and said observer, a detected light ray which is emitted from said first display means being reflected by said beamsplitting means, and admitted by said field stop means onto the photosensitive surface of said detector means, said detector means lying substantially along the line of sight of said reticle means as viewed by said observer.

12. A target designation system as in claim 11, wherein said first display means comprises a roll of film having scenarios and targets photographically recorded thereon and a cathode ray tube having a screen substantially uniformly illuminated by a raster formed by a scanning spot.

13. A target designation system as in claim 12, wherein the light rays emitted by said scanning spot can be detected by said detector means only when said scanning spot occupies a point on said cathode ray tube screen corresponding to the location on said film at which the image of said reticle means is superimposed.

14. A target designation system as in claim 8, further comprising optical means for maintaining apparent real world angular magnitudes and directions regardless of the motion of the head of said observer, said optical means being positioned between said first display means and said beamsplitting means along the line of sight of said observer.

15. A target designation system as in claim 14, wherein said optical means comprises a magnifier lens.

16. A target designation system in claim 14, wherein said optical means comprises a Fresnel lens.

17. A target designation system as in claim 8, further comprising first support means by which said beamsplitting means is rigidly fixed to a helmet worn by said observer, and second support means by which said first and second optical trains are rigidly fixed relative to said beamsplitting means.

18. A target designation system as in claim 8, wherein said first optical train comprises a light source, said reticle means, and a first projection lens aligned so that said light source projects the image of said reticle means through said first projection lens and onto said beamsplitting means.

19. A target designation system as claim 9, wherein said second optical train further comprises a second projection lens positioned between said beamsplitting means and said field stop means along the optical path defined by said field stop means.

20. A target designation system as in claim 12, wherein said first display means further comprises scenario drive means for displaying a predetermined scenario in response to commands from said computer means.

21. A target designation system as in claim 7, wherein said means for outputting electrical signals comprises deflection yoke circuitry operatively connected to said cathode ray tube for controlling said scanning spot.

22. A target designation system as in claim 15, wherein said computer means further comprises coding means for transforming said electrical signals into binary data and comparison means for comparing the binary data corresponding to the position coordinates of said target on which the image of said reticle means is superimposed with the binary data corresponding to the position coordinates of said targets stored in said memory means.

23. A target designation system as in claim 7, wherein a weighting value for each of said targets is stored in said memory means, said computer means further comprises totaling means for computing the sum of the weighting values for the targets acquired by said observer, and said alphanumeric data displayed by said second display means further comprises said sum of weighting values.

24. A target designation system as in claim 7, further comprising instructor input means operatively connected to said computer means for inputting data or instructions.

25. A target designation system as in claim 7, wherein said computer means stores a corresponding assignation for each of said targets.

* * * * *